United States Patent Office 3,741,969
Patented June 26, 1973

3,741,969
CERTAIN 3 - (β-CARBETHOXYETHYL)- AND 3 - (β-CARBOXYETHYL) - 4 - PHENYL-3,4-DIHYDRO- AND 1,2,3,4-TETRAHYDRO-QUINAZOLINES
Hans Ott, Basel-Land, Switzerland, assignor to Sandoz-Wander, Inc., Hanover, N.J.
No Drawing. Original application Dec. 9, 1966, Ser. No. 600,403, now Patent No. 3,577,557. Divided and this application Jan. 18, 1971, Ser. No. 107,477
The portion of the term of the patent subsequent to Nov. 25, 1986, has been disclaimed
Int. Cl. C07d 51/48
U.S. Cl. 260—251 Q                       8 Claims

ABSTRACT OF THE DISCLOSURE

The invention discloses compounds of the class of 6-phenyl-3,4-dihydro[1,5]benzodiazocin-2-(IH)-ones useful as tranquilizers. Also disclosed is preparation of said compounds featuring intermediates which are 1,5-methano-1,5-benzodiazocin-2-ones which are converted by acid treatment to the corresponding 6-phenyl-3,4,5,6-tetrahydro[1,5]benzodiazocin-2-(1H)-ones which in turn may be oxidized to obtain the first-mentioned class of compounds. The bridged intermediates are prepared by dehydration of a 3-(β-carboxyethyl)-4-phenyl-1,2,3,4-tetrahydroquinazoline which is prepared by reduction of a 3-(β-carboxyethyl)-4-phenyl-3,4-dihydroquinazoline which is prepared by hydrolysis of a corresponding ester.

---

This application is a divisional of copending application Ser. No. 600,403, filed Dec. 9, 1966, now U.S. Letters Patent No. 3,577,557.

This invention relates to novel bicyclic compounds. In particular, the invention pertains to 6-phenyl-3,4-dihydro[1,5]benzodiazocinones and methods for preparing the same. The invention further relates to intermediates which are useful in preparing the above compounds and processes for preparing said intermediates.

The 3,4-dihydro[1,5]benzodiazocinones of the present invention may be represented structurally as follows:

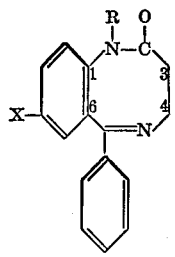

I wherein

X represents hydrogen; chloro; bromo; nitro or trifluoromethyl; and
R represents hydrogen; lower alkyl, preferably containing from 1 to 4 carbon atoms, e.g., methyl, ethyl, propyl and butyl; or di(lower)alkylamino(lower)alkyl, each of the alkyl substituents being the same or different and preferably containing from 1 to 4 carbons, e.g., dimethylaminomethyl, β-dimethylaminoethyl, γ-dimethylaminopropyl, N-methyl-N-ethylaminoethyl and γ-diethylaminopropyl.

The above compounds are prepared by treating a 6-phenyl - 1,3,4,5 - tetrahydro-6H-1,5-methano-1,5-benzodiazocin-2-one with an acid to form the corresponding 6-phenyl - 3,4,5,6-tetrahydro[1,5]benzodiazocin-2(1H)-one, reacting the latter with an appropriate alkylating agent where substitution at the 1-position is desired and then oxidizing the resulting 1-unsubstituted or 1-substituted derivative. The preparation of the 1-substituted derivative can also be accomplished by first oxidizing the 6-phenyl-3,4,5,6-tetrahydro[1,5]benzodiazocin-2(1H)-one to form the corresponding 6 - phenyl-3,4-dihydro[1,5]benzodiazocine-2(1H)-one and then treating the latter with an appropriate alkylating agent. These processes are illustrated by the following Reaction Scheme:

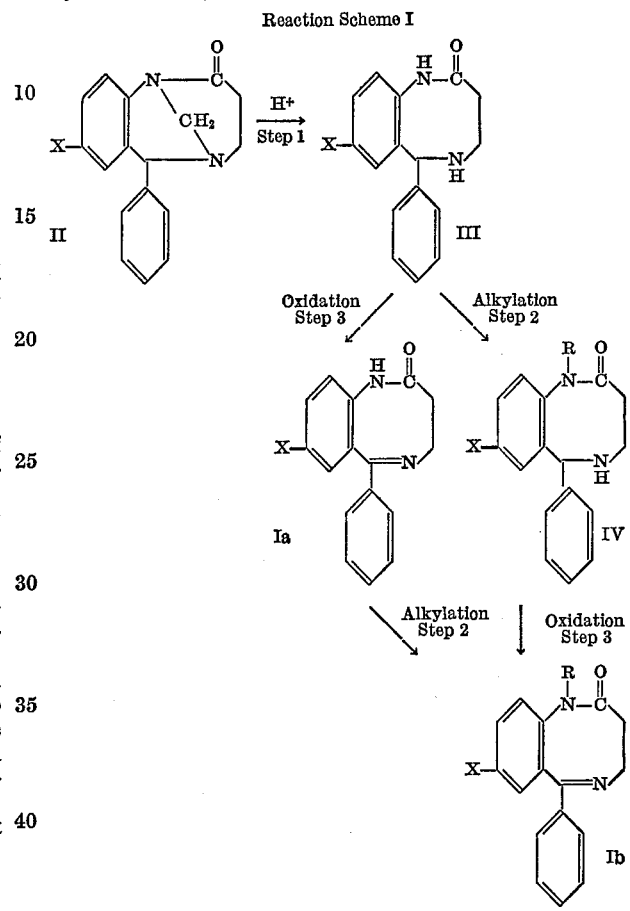

Wherein X is as previously defined, and R is other than hydrogen but is otherwise as defined above.

Conversion of the bridged benzodiazocinone (II) to the corresponding 3,4,5,6-tetrahydrobenzodiazocinone (III), as illustrated by Step 1, is conveniently carried out in strongly acidic aqueous medium and at room temperature (20–25° C.). Desirably, the acid concentration is in the range of from about 0.1 Normal to about 2 Normal and preferably is in the range of from about 0.1 Normal to about 1 Normal. Suitable acids which may be employed include the inorganic acids, such as the mineral acids, e.g., hydrocholric acid, sulfuric acid and phosphoric acid, and the organic acids, e.g., oxalic acid, formic acid and tartaric acid. Where the starting material is insoluble in aqueous acid, a suitable water-miscible inert organic solvent, e.g., dioxane, can be utilized to solubilize the same and thereby facilitate the reaction.

In Step 2 of the process, the tetrahydrobenzodiazocinone (III) or dihydrobenzodiazocinone (Ia) is converted in conventional manner to the 1-metallo derivative in a suitable inert organic solvent, e.g., dimethylformamide, dimethylacetamide, diethylacetamide, dimethylsulfoxide and dioxane, and at room temperature, preferably by treatment with an alkali metal alkoxide, e.g., sodium methoxide and potassium ethoxide, or sodium hydride and the resulting alkali metal salt then treated with an appropriate alkylating agent in conventional manner. For the preparation of the 1-alkyl derivatives, an appropriate alkyl halide, preferably the bromide or iodide, e.g., methyl bromide, methyl iodide, ethyl iodide and the like, or a dialkylsulfate, e.g., dimethylsulfate and the like, is employed as the alkylating agent. For the preparation of those compounds which are substituted at the 1-position with a di(lower)alkylamino (lower)alkyl substituent the corresponding halide, preferably the bromide or chloride, e.g., dimethylaminomethyl chloride, β-dimethylaminoethyl bromide, γ-dimethylaminopropyl chloride and β - (N-methyl-N-ethylamino)ethyl chloride, is employed as the alkylating agent.

The reaction of alkali metal salt with the alkylating agent is preferably carried out in the same solvent employed to prepare the alkali metal salt. However, if desired, the alkali metal salt can be isolated and then treated with the alkylating agent. The reaction temperature is not critical and will for the most part be dependent upon the reactivity of the alkylating agent. With the more reactive alkylating agents the reaction can be conveniently carried out at room temperature or below (10–25° C.), whereas with the less reactive alkylating agent elevated temperatures can be employed to facilitate the reaction.

The oxidation (Step 3) of the tetrahydrobenzodiazocinone, III or IV, is readily effected in a suitable inert organic solvent, e.g., dioxane and acetone, and at room temperature and in the presence of permanganate ions. Preferably, the oxidation is carried out employing sodium or potassium permanganate.

The starting compounds employed in Reaction Scheme I are prepared by reacting 4-phenyl-3,4-dihydroquinazoline or an appropriately substituted derivative thereof with an acrylic acid ester, preferably a lower alkyl ester, e.g., methyl acrylate and ethyl acrylate, to form the corresponding 3 - (β-carbalkoxyethyl)-4-phenyl-3,4-dihydroquinazoline, converting the latter to the corresponding 3 - (β-carboxyethyl)-4-phenyl-3,4-dihydroquinazoline, reducing the latter to the corresponding 3-(β-carboxyethyl)-4-phenyl-1,2,3,4-tetrahydroquinazoline and dehydrating the latter. This process may be illustrated as follows:

Reaction Scheme II

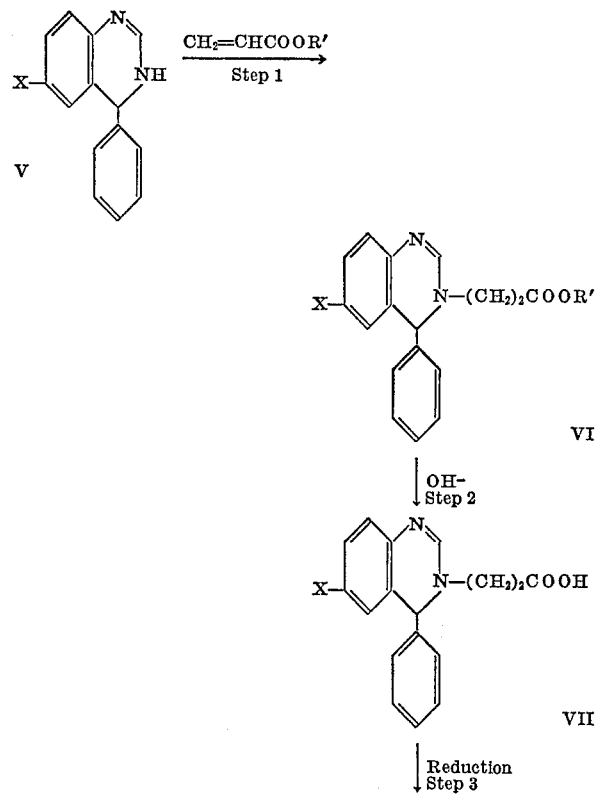

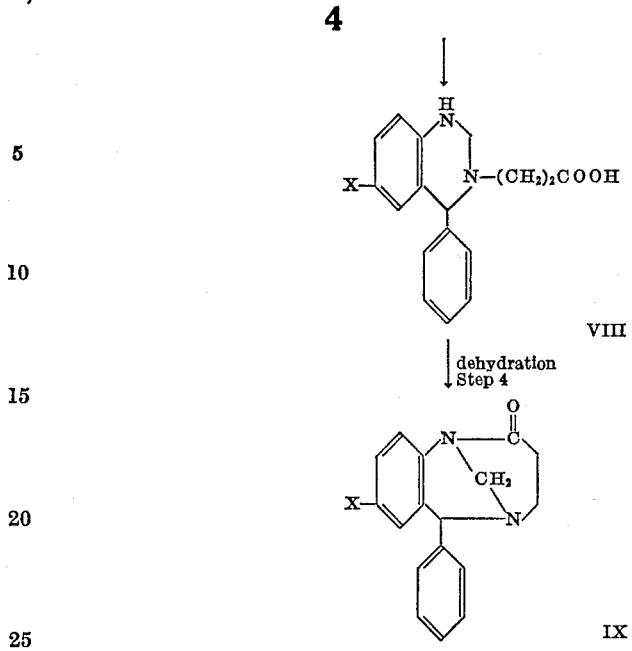

Wherein X is as previously defined and $R^1$ represents alkyl, desirably lower alkyl containing from 1 to 4 carbon atoms and preferably methyl or ethyl.

The reaction of the dihydroquinazoline (V) with the acrylic acid ester can be carried out in any suitable inert organic solvent, e.g., dioxane, benzene and toluene, and at elevated temperatures, preferably reflux temperature. However, the use of a solvent is not necessary since an excess of the acrylate reactant can be used for this purpose. Various of the dihydroquinazolines and acrylic acid esters employed are known and can be prepared as described in the literature. Such others which may not be specifically known can be prepared from available materials in analogous manner.

In Step 2 of the process a 3-(β-carbalkoxyethyl)-4-phenyl-3,4-dihydroquinazoline (VI) is hydrolyzed to the corresponding 3 - (β-carboxyethyl)-4-phenyl-3,4-dihydroquinazoline (VII). The hydrolysis is readily carried out in an aqueous inert organic solvent at room temperature or elevated temperatures and in the presence of a strong base. The organic solvent is desirably one which is water-miscible, e.g., methanol, ethanol, dioxane and tetrahydrofuran, and the base is preferably an alkali metal hydroxide, e.g., sodium hydroxide, potassium hydroxide and lithium hydroxide, although other strong bases, such as barium hydroxide can also be used.

Conversion of the dihydroquinazoline (VII) to the corresponding tetrahydroquinazoline (VIII) (Step 3) is effected by chemical reduction employing a borohydride, e.g., sodium borohydride, as the reducing agent. The reduction is conveniently carried out in an inert organic solvent, e.g., methanol, ethanol, dioxane and tetrahydrofuran, and at room temperature or elevated temperature up to reflux temperature.

In the last step of the process (Step 4) the tetrahydroquinazoline (VIII) is converted to the bridged benzodiazocinone (IX) by dehydration. The dehydration can be readily effected employing dehydrating agents conventionally used to bring about ring closure, e.g., thionyl chloride, phosphorus pentachloride and the like. However, the preferred dehydrating agents are the lower alkyl halocarbonates, e.g., ethyl chlorocarbonate. The dehydration is carried out in an inert organic solvent, e.g., dioxane, methylene chloride and tetrahydrofuran, and at room temperature, preferably in the presence of a tertiary amine base, e.g., triethylamine and tertiary butylamine.

The compounds of structural Formula I are useful because they possess pharmacological activity in animals. In particular, the compounds are central nervous system depressants and can be used as tranquilizers. For such usage the compounds may be combined with a pharmaceutically acceptable carrier, and such other adjuvants as may be necessary, and administered orally in such forms as tablets, capsules, elixirs, suspensions and the like or parenterally in the form of an injectable solution or suspension. The dosage administered will, of course, vary depending upon the compound employed and the mode of administration. However, in general, satisfactory results are obtained when administered at a daily dosage of from about 2 milligrams to about 15 milligrams per kilogram of body weight, preferably given in divided doses, 2 to 4 times a day, or in sustained release form. For both larger mammals and small domestic mammals the daily dosage is generally from about 150 milligrams to about 1000 milligrams and the preferred dosage forms comprise from about 50 milligrams to about 500 milligrams of the compound admixed with a solid or liquid pharmaceutical carrier or diluent.

The intermediate compounds of Formulas III and IV also possess pharmacological activity in animals. In particular, such compounds are central nervous system depressants and can be employed as tranquilizers. For such usage the compounds may be administered in the same manner and at the same dosage as indicated above for compounds of Formula I.

A representative formulation is a tablet (prepared by standard tabletting techniques) and containing the following ingredients:

| Ingredient: | Parts by weight |
|---|---|
| 8-chloro-1-methyl-6-phenyl-3,4-dihydro - [1,5] benzodiazocin-2(1H)-one | 50 |
| Tragacanth | 2 |
| Lactose | 39.5 |
| Corn starch | 5 |
| Talcum | 3 |
| Magnesium stearate | 0.5 |

The following examples show representative compounds encompassed within the scope of this invention and the manner in which such compounds are prepared.

EXAMPLE 1

8-chloro-6-phenyl-3,4-dihydro-[1,5]benzodiazocin-2(1H)-one

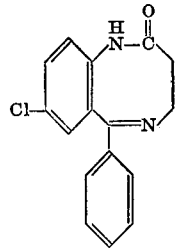

Step A.—Preparation of 3-(β-carbethoxyethyl)-6-chloro-4-phenyl-3,4-dihydroquinazoline A solution of 3.8 g. of 6-chloro-4-phenyl-3,4-dihydroquinazoline in 50 ml. of ethyl acrylate is refluxed for 4 hours, then evaporated in vacuo and the residue crystallized from diethyl ether to obtain 3-(β-carbethoxyethyl)-6-chloro-4-phenyl-3,4-dihydroquinazoline, M.P. 107–108° C.

Step B.—Preparation of 3-(β-carboxyethyl)-6-chloro-4-phenyl-3,4-dihydroquinazoline A solution of 2.75 g. of 3-(β-carbethoxyethyl)-6-chloro-4-phenyl-3,4-dihydroquinazoline in 30 ml. of ethanol and 12 ml. of 2 N sodium hydroxide is kept at room temperature overnight and then most of the ethanol is removed at room temperature in vacuo. To the resulting mixture is added 250 ml. of 2 N hydrochloric acid and the resulting solution saturated with sodium chloride and extracted 3 times with 30 ml. (each) of a mixture of chloroform and methanol (9:1). The organic phase is evaporated and the residue crystallized from methylene chloride/ethanol (1:4) to obtain 3-(β-carboxyethyl)-6-chloro-4-phenyl-3, 4-dihydroquinazoline, M.P. 166–167° C.

Step C.—Preparation of 3-(β-carboxyethyl)-6-chloro-4-phenyl-1,2,3,4-tetrahydroquinazoline To a solution of 29.3 g. of 3-(β-carboxyethyl)-6-chloro-4-phenyl-3,4-dihydroquinazoline in 300 ml. of ethanol and 120 ml. of 2 N sodium hydroxide is added 10 g. of sodium borohydride. The resulting mixture is heated at 60° C. for 1 hour, the excess borohydride decomposed by the dropwise addition of 2 N hydrochloric acid until gas evolution ceases and the ethanol then evaporated off at 40° C. in vacuo. The resulting mixture is then neutralized with 2 N hydrochloric acid to a pH of 7 and then extracted 3 times with 200 ml. (each) of chloroform. The combined extracts are dried over anhydrous sodium sulfate and then evaporated to dryness in vacuo to obtain 3-(β-carboxyethyl)-6-chloro-4-phenyl-1,2,3,4-tetrahydroquinazoline as a light yellow amorphous residue.

Step D.—Preparation of 8-chloro-6-phenyl-1,3,4,5-tetrahydro-6H-1,5-methano-1,5-benzodiazocin-2-one To a solution of 17 g. of 3-(β-carboxethyl)-6-chloro-4-phenyl-1,2,3,4-tetrahydroquinazoline and 14 ml. of triethylamine in 175 ml. of dry dioxane, at 5–10° C., is added dropwise over a period of 5–10 minutes, 6.5 ml. of ethylchlorocarbonate. The resulting solution is stirred at room temperature for 30 minutes and then evaporated to dryness in vacuo at 40–50° C. The residue is dissolved in 200 ml. of methylene chloride and the resulting solution extracted twice with 100 ml. (each) of a saturated sodium bicarbonate solution. The organic phase is dried over anhydrous sodium sulfate and then evaporated and the residue crystallized from diethyl ether to obtain 8-chloro-6-phenyl-1,3,4,5-tetrahydro-6H-1,5-methano - 1,5-benzodiazocin-2-one, M.P. 169–170° C.

Step E.—Preparation of 8-chloro-6-phenyl-3,4,5,6-tetrahydro-[1,5]benzodiazocin-2(1H)-one A solution of 13.6 g. of 8-chloro-6-phenyl-1,3,4,5-tetrahydro-6H-1,5-methano-1,5-benzodiazocin-2-one, 800 ml. of dioxane, 1100 ml. of water and 100 ml. of 2 N hydrochloric acid is allowed to stand at room temperature for 30 minutes, then made basic by the addition of 220 ml. of 1 N sodium bicarbonate solution and then concentrated in vacuo to remove most of the dioxane. The crystalline material which is formed is recovered by filtration and recrystallized from ethyl acetate to obtain 8-chloro-6-phenyl-3,4,5,6-tetrahydro-[1,5]benzodiazocin-2(1H)-one, M.P. 220° C.

Step F.—Preparation of 8-chloro-6-phenyl-3,4-dihydro-[1,5]benzodiazocin-2(1H)-one To a solution of 4.5 g. of 8-chloro-6-phenyl-3,4,5,6-tetrahydro-[1,5]benzodiazocin-2(1H)-one in 150 ml. of dry dioxane is added a solution of 2.0 g. of potassium permanganate in 40 ml. of water. The reaction mixture is allowed to stand at room temperature for 4 hours, then filtered and the filtrate evaporated to dryness in vacuo. The residue is added to a mixture of 100 ml. of methylene chloride and 50 ml. of 5% sodium bicarbonate solution. The organic phase is separated, dried over anhydrous sodium sulfate and evaporated in vacuo. The residue is crystallized from diethyl ether to obtain 8-chloro-6-phenyl-3,4-dihydro-[1,5]benzodiazocin - 2(1H)-one, MP. 164–166° C.

EXAMPLE 2

8-chloro-1-methyl-6-phenyl-3,4-dihydro-[1,5]benzodiazocin-2(1H)-one

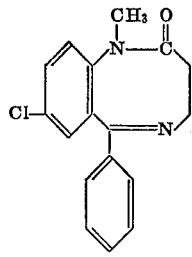

To a solution of 4.2 g. of 8-chloro-6-phenyl-3,4-dihydro-[1,5]benzodiazocin-2(1H)-one in 150 ml. of dimethylformamide is added 0.9 g. of sodium methoxide. The resulting mixture is stirred for 10 minutes at room temperature and then cooled to 10° C. To the resulting cooled solution is added, within 10 minutes, 3 ml. of methyl iodide and the resulting mixture is allowed to stand for 15 minutes at 20° C. and then evaporated in vacuo at 60° C. The residue is added to a mixture of 100 ml. of methylene chloride and 50 ml. of a 5% solution of sodium bicarbonate. The organic phase is separated, dried over anhydrous sodium sulfate and evaporated. The residue is crystallized from diethyl ether to obtain 8-chloro-1-methyl-6-phenyl-3,4-dihydro-[1,5]benzodiazocin - 2(1H)-one M.P. 167–168° C.

EXAMPLE 3

8-chloro-1-methyl-6-phenyl-3,4-dihydro-[1,5]benzodiazocin-2(1H)-one (Alternate method)

Step A.—Preparation of 8-chloro-1-methyl-6-phenyl-3,4,5,6-tetrahydro-[1,5]benzodiazocin-2(1H)-one To a solution of 4.5 g. of 8-chloro-6-phenyl-3,4,5,6-tetrahydro-[1,5]benzodiazocin-2(1H)-one in 110 ml. of dimethylformamide is added 1.0 g. of sodium methoxide. The resulting mixture is stirred for 10 minutes at room temperature and then cooled to 10° C. To the resulting solution is added, within 10 minutes, 1.94 ml. of methyl iodide and the resulting mixture is allowed to stand at 20° C. for 15 minutes and then evaporated in vacuo at 60° C. The residue is added to a mixture of 100 ml. of methylene chloride and 50 ml. of a 5% solution of sodium bicarbonate. The organic phase is separated, dried over anhydrous sodium sulfate and evaporated. The residue is crystallized from diethyl ether to obtain 8-chloro-1-methyl-6-phenyl - 3,4,5,6 - tetrahydro-[1,5]benzodiazocin-2(1H)-one, M.P. 151–153° C.

Step B.—Preparation of 8-chloro-1-methyl-6-phenyl-3,4-dihydro-[1,5]benzodiazocin-2(1H)-one To a solution of 0.6 g. of 8-chloro-1-methyl-6-phenyl-3,4,5,6 - tetrahydro-[1,5]benzodiazocin-2(1H)-one in 20 ml. of dry dioxane is added 5 ml. of an aqueous potassium permanganate solution (5.27 g./100 ml.). The reaction mixture is allowed to stand at room temperature for 3 hours, then filtered and the filtrate evaporated to dryness in vacuo. The residue is added to a mixture of 20 ml. of methylene chloride and 10 ml. of a saturated solution of sodium chloride. The organic phase is separated, dried over anhydrous sodium sulfate and evaporated in vacuo. The residue is crystallized from diethyl ether to obtain 8-chloro-1-methyl-6-phenyl-3,4-dihydro-[1,5]benzodiazocin-2(1H)-one, M.P. 167–168° C.

EXAMPLE 4

1-methyl-6-phenyl-3,4-dihydro-[1,5]benzodiazocin-2(1H)-one

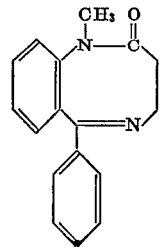

Step A.—Preparation of 3-(β-carbethoxyethyl)-4-phenyl-3,4-dihydroquinazoline

A solution of 20 g. of 4-phenyl-3,4-dihydroquinazoline in 180 ml. of ethyl acrylate is refluxed for 2 hours, then evaporated in vacuo to obtain 3 - (β-carbethoxyethyl)-4-phenyl-3,4-dihydroquinazoline as an oil.

Step B.—Preparation of 3-(β-carboxyethyl)-4-phenyl-3,4-dihydroquinazoline

A solution of 29.5 g. of 3 - (β-carbethoxyethyl)-4-phenyl-3,4-dihydroquinazoline, 400 ml. of ethanol and 250 ml. of 2 N sodium hydroxide is kept overnight at room temperature and then most of the ethanol is removed at room temperature in vacuo. To the resulting mixture is added 250 ml. of 2 N hydrochloric acid and the resulting solution saturated with sodium chloride and extracted 3 times with 300 ml. (each) of a mixture of chloroform and methanol (9:1). The organic phase is evaporated to obtain 3-(β-carboxyethyl)-4-phenyl-3,4-dihydroquinazoline.

Step C.—Preparation of 3-(β-carboxyethyl)-4-phenyl-1,2,3,4-tetrahydroquinazoline To a solution of 28 g. of 3 - (β-carboxyethyl)-4-phenyl-3,4-dihydroquinazoline, 500 ml. of ethanol and 130 ml. of 1 N sodium hydroxide is added 10 g. of sodium borohydride. The resulting mixture is heated at 60° C. for 1 hour, the excess borohydride decomposed by the dropwise addition of 2 N hydrochloric acid until gas evolution ceases and the ethanol then evaporated off at 40° C. in vacuo. The resulting mixture is then neutralized with 2 N hydrochloric acid to a pH of 7 and then extracted 3 times with 200 ml. (each) of chloroform. The combined extracts are then dried over anhydrous sodium sulfate and then evaporated to dryness in vacuo to obtain 3-(β-carboxyethyl)-4-phenyl-1,2,3,4-tetrahydroquinazoline as a light yellow amorphous residue.

Step D.—Preparation of 6-phenyl-1,3,4,5-tetrahydro-6H-1,5-methano-1,5-benzodiazocin-2-one To a solution of 10 g. of 3 - (β-carboxyethyl)-4-phenyl-1,2,3,4-tetrahydroquinazoline and 10 ml. of triethylamine in 100 ml. of dry dioxane, at 5–10° C., is added dropwise within 5 to 10 minutes, 3.9 g. of ethyl chlorocarbonate. The resulting solution is stirred at room temperature for 30 minutes and then evaporated to dryness in vacuo at 40–50° C. The residue is dissolved in 200 ml. of methylene chloride and the resulting solution extracted twice with 100 ml. (each) of a saturated sodium bicarbonate solution. The organic phase is dried over anhydrous sodium sulfate and then evaporated and the residue crystallized from ethyl acetate to obtain 6 - phenyl-1,3,4,5-tetrahydro-6H - 1,5 - methano - 1,5 - benzodiazocin-2-one, M.P. 197–198° C.

Setp E.—Preparation of 6-phenyl-3,4,5,6-tetrahydro-[1,5]benzodiazocin-2(1H)-one

A solution of 15 g. of 6 - phenyl - 1,3,4,5-tetrahydro-6H - 1,5 - methano - 1,5 - benzodiazocin-2-one in 2100 ml. of water and 140 ml. of 2 N hydrochloric acid is allowed to stand at room temperature for 40 minutes, then made slightly basic by the addition of 300 ml. of 1 N sodium bicarbonate solution and then extracted 3 times with 200 ml. (each) of methylene chloride. The combined extracts are then dried over anhydrous sodium sulfate, filtered and the filtrate evaporated to dryness in vacuo. The residue is crystallized from ethyl acetate to obtain 6 - phenyl - 3,4,5,6 - tetrahydro - [1,5]benzodiazocin-2(1H)-one, M.P. 191–193° C.

Step F.—Preparation of 1–methyl-6-phenyl-3,4,5,6-tetrahydro-[1,5]benzodiazocin-2(1H)-one To a solution of 0.5 g. of 6-phenyl-3,4,5,6-tetrahydro-[1,5]benzodiazocin-2(1H)-one in 10 ml. of dimethylformamide is added 120 mg. of sodium methoxide. The resulting mixture is stirred for 10 minutes at room temperature and then cooled to 10° C. To the resulting cooled solution is added, within 10 minutes, 0.3 ml. of methyl iodide and the resulting mixture is allowed to stand for 15 minutes at 20° C. and then evaporated in vacuo at 60° C. The residue is added to a mixture of 20 ml. of methylene chloride and 10 ml. of 5% sodium bicarbonate solution. The organic phase is separated, dried over anhydrous sodium sulfate and evaporated. The residue is crystallized from diethyl ether to obtain 1 - methyl - 6 - phenyl - 3,4,5,6 - tetrahydro-[1,5]benzodiazocin-2(1H)-one, M.P. 140–141° C.

Step G.—Preparation of 1-methyl-6-phenyl-3,4-dihydro-[1,5]benzodiazocin-2(1H)-one To a solution of 0.6 g. of 1 - methyl - 6 - phenyl-3,4,5,6-tetrahydro - [1,5]benzodiazocin - 2(1H)-one in 20 ml. of dioxane is added 5 ml. of an aqueous potassium permanganate solution (5.27 g./100 ml.). The reaction mixture is allowed to stand at room temperature for 3 hours, then filtered and the filtrate evaporated to dryness in vacuo. The residue is added to a mixture of 20 ml. of methylene chloride and 10 ml. of a saturated solution of sodium chloride. The organic phase is separated, dried over anhydrous sodium sulfate and evaporated in vacuo to obtain 1 - methyl - 6 - phenyl - 3,4 - dihydro-[1,5]benzodiazocin-2(1H)-one.

What is claimed is:
1. A compound of the formula

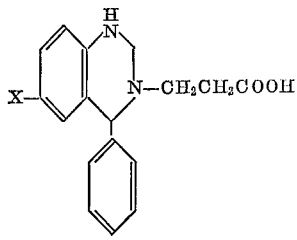

wherein

X represents hydrogen, chloro, bromo, nitro or trifluoromethyl.

2. The compound of claim 1 which is 3-($\beta$-carboxyethyl)-6-chloro-4-phenyl-1,2,3,4-tetrahydroquinazoline.

3. The compound of claim 1 which is 3-($\beta$-carboxyethyl)-4-phenyl-1,2,3,4-tetrahydroquinazoline.

4. A compound of the formula

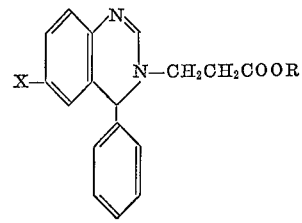

wherein

X represents hydrogen, chloro, bromo, nitro or trifluoromethyl; and
R represents hydrogen or alkyl of 1–4 carbon atoms.

5. The compound of claim 4 which is 3-($\beta$-carbethoxyethyl)-6-chloro-4-phenyl-3,4-dihydroquinazoline.

6. The compound of claim 4 which is 3-($\beta$-carbethoxyethyl)-4-phenyl-3,4-dihydroquinazoline.

7. The compound of claim 4 which is 3-($\beta$-carboxyethyl)-6-chloro-4-phenyl-3,4-dihydroquinazoline.

8. The compound of claim 4 which is 3-($\beta$-carboxyethyl)-4-phenyl-3,4-dihydroquinazoline.

References Cited
UNITED STATES PATENTS
3,480,629   11/1969   Ott _____ 260—251

ALEX MAZEL, Primary Examiner
R. V. RUSH, Assistant Examiner